(12) United States Patent
Hirano et al.

(10) Patent No.: US 9,914,818 B2
(45) Date of Patent: Mar. 13, 2018

(54) CROSSLINKABLE FLUORINE-CONTAINING ELASTOMER COMPOSITION AND MOLDED ARTICLE MADE OF SAID COMPOSITION

(75) Inventors: Seiichi Hirano, Settsu (JP); Tsuyoshi Noguchi, Settsu (JP)

(73) Assignees: Greene, Tweed Technologies, Inc., Wilmington, DE (US); Daikin Industries, Ltd., Osaka (JP)

( * ) Notice: Subject to any disclaimer, the term of this patent is extended or adjusted under 35 U.S.C. 154(b) by 484 days.

(21) Appl. No.: 13/142,836

(22) PCT Filed: Dec. 24, 2009

(86) PCT No.: PCT/JP2009/071882
§ 371 (c)(1),
(2), (4) Date: Oct. 18, 2011

(87) PCT Pub. No.: WO2010/076889
PCT Pub. Date: Jul. 8, 2010

(65) Prior Publication Data
US 2012/0289641 A1    Nov. 15, 2012

Related U.S. Application Data

(60) Provisional application No. 61/141,209, filed on Dec. 29, 2008.

(51) Int. Cl.
*C08K 3/14*    (2006.01)

(52) U.S. Cl.
CPC .......... *C08K 3/14* (2013.01); *C08K 2201/002* (2013.01)

(58) Field of Classification Search
CPC ............................ C08K 3/14; C08K 2201/002
USPC .......................... 423/346; 524/443, 544, 546
See application file for complete search history.

(56) References Cited

U.S. PATENT DOCUMENTS

| | | | | |
|---|---|---|---|---|
| 5,093,403 | A | * | 3/1992 | Rau et al. ..................... 524/404 |
| 8,173,727 | B2 | * | 5/2012 | Nishibayashi et al. ......... 524/80 |
| 2001/0044019 | A1 | * | 11/2001 | Huesmann ..................... 428/325 |
| 2005/0070637 | A1 | * | 3/2005 | Nishibayashi et al. ......... 524/80 |
| 2006/0051280 | A1 | * | 3/2006 | Moy et al. ..................... 423/345 |
| 2011/0224350 | A1 | * | 9/2011 | Coates et al. .................. 524/443 |

FOREIGN PATENT DOCUMENTS

| | | |
|---|---|---|
| EP | 1 464 676 A1 | 10/2004 |
| EP | 1 935 939 A1 | 6/2008 |
| JP | 59013616 A  * | 1/1984 |

OTHER PUBLICATIONS

Majewski et al., "Synthesis and characterisation of star polymer/silicon carbide nanocomposites", Materials Science and Engineering A, 434, 2006, 360-364.*
International Search Report for PCT/JP2009/071882, dated Jun. 8, 2010.

* cited by examiner

*Primary Examiner* — Nicole M Buie-Hatcher
(74) *Attorney, Agent, or Firm* — Flaster/Greenberg P.C.

(57) ABSTRACT

There are provided a crosslinkable elastomer composition which assures a small change in weight in both of There are provided a crosslinkable elastomer composition which assures a small change in weight in both of $O_2$ plasma treatment and $O_2/CF_4$ plasma treatment and is capable of significantly inhibiting generation of foreign matters (particles) in these treatments, and a molded article made of the composition. The crosslinkable fluorine-containing elastomer composition comprises a crosslinkable fluorine-containing elastomer, silicon carbide particles having a bulk density of not more than 0.15 g/cm$^3$, and further a crosslinking agent as case demands, and the molded article is obtained by crosslinking the composition.

13 Claims, No Drawings

CROSSLINKABLE FLUORINE-CONTAINING ELASTOMER COMPOSITION AND MOLDED ARTICLE MADE OF SAID COMPOSITION

CROSS-REFERENCE TO RELATED APPLICATIONS

This patent application is a § 371 National Phase application based on International Application No. PCT/JP2009/071882, filed December 2009, published in the English language as International Publication No. WO 2010/076889 A1 on Jul. 8, 2010; and claims the benefit under 35 U.S.C. § 119(e) of U.S. Provisional Application No. 61/141,209 filed on Dec. 29, 2008, incorporated herein by reference in its entirety.

BACKGROUND OF THE INVENTION

Field of the Invention

The present invention relates to a crosslinkable fluorine-containing elastomer composition and a molded article made of the composition.

Description of Related Art

Fluorine-containing elastomers, particularly perfluoroelastomers predominantly comprising a tetrafluoroethylene (TFE) unit are widely used as sealing materials, etc. to be used under harsh environment because of excellent chemical resistance, solvent resistance and heat resistance thereof.

However, with advances in technologies, more rigorous demand for characteristics required have been imposed, and in the fields of aviation and space industries, semiconductor manufacturing equipment, and chemical plant, sealing property under higher temperature environment of not less than 300° C. is demanded. The use of a sealing material under such a high temperature environment induces partial deterioration of a polymer, and accelerates generation of hydrogen fluoride (HF). It is conjectured that HF generated at high temperature not only has an adverse effect on materials coming into contact with the polymer but also attacks a molecular chain and a cure site of an elastomer, thus giving adverse effect on them.

So far, trial has been made to reduce generation of HF by adding silicic acid anhydride ($SiO_2$) (JP2002-515525A) to a fluorine-containing elastomer. While generation of HF is sufficiently reduced by such a method, since $SiO_2$ has a lot of functional groups on its surface, control of water amount is difficult, which is a factor of generating outgas resulting from water. In addition, when a large amount of $SiO_2$ is blended, there is delay of curing in crosslinking reaction.

In semiconductor manufacturing process, CVD equipment, etching equipment and ashing equipment are used in steps for forming an insulating film and a thin film for metallic wire. In such equipment, elastomeric sealing materials are used for sealing of various connecting parts and movable parts thereof. These sealing materials are required to have not only sealing property but also plasma resistance for $O_2$ and fluorine-containing gases, and in order to meet requirements for fine fabrication and large size substrate wafer, are also required to withstand harsh conditions for plasma treatment such as high density ($10^{12}$ to $10^{13}/cm^3$) and not to contaminate semiconductors to be subjected to very precise processing. Crosslinkable fluorine-containing elastomers are used as elastomeric materials for sealing materials being capable of satisfying such requirements. Further, in order to achieve more sufficient mechanical strength as compared with the case of crosslinking an elastomer alone, usually organic or inorganic filler is blended to an elastomer. Examples of fillers which have been used or proposed are carbon black, silica (Japanese Patent No. 2783576 and Japanese Patent No. 2858198), polytetrafluoroethylene (PTFE) powder, perfluoroalkoxyalkane (PFA powder), titanium oxide powder and barium sulfate.

In addition, in semiconductor manufacturing process, there is a wet process for washing a wafer by using ozone ($O_3$) water. Accordingly, sealing materials are required to be stable in not only $NF_3$ plasma treatment but also $O_3$ treatment.

However, among the above-mentioned fillers, fillers such as silica and titanium oxide are stable in $O_3$ treatment but are subject to decomposition in $NF_3$ plasma treatment, resulting in weight reduction. On the other hand, fillers such as carbon black and PTFE powder are stable in $NF_3$ plasma treatment but are subject to decomposition in ozone treatment, resulting in weight reduction.

In order to eliminate the mentioned problems, WO 03/051999 proposes to blend fillers such as compounds having a specific surface area of not less than 0.5 $m^2/g$ and containing an aromatic ring and non-oxide fillers such as borides, carbides, nitrides, silicides, sulfides and phosphides. In this proposal, effect of improving resistance to $NF_3$ remote plasma and resistance to $O_3$ appears, but there is still room for improvement in minimizing weight reduction and inhibiting generation of particles in high density plasma treatment using $O_2$ gas and fluorine-containing gas.

BRIEF SUMMARY OF THE INVENTION

It is an object of the present invention to provide a crosslinkable fluorine-containing elastomer composition which assures a small change in weight in both of $O_2$ plasma treatment and $O_2/CF_4$ plasma treatment and is capable of significantly inhibiting generation of foreign matters (particles) in these treatments, and to provide a molded article made of the composition.

Generation of particles mentioned above means that fine powder components deposit and remain on a surface of an O-ring when the O-ring is irradiated with plasma. These fine powder components are mainly components derived from filler, vulcanization agent and vulcanization accelerator blended to rubbers. In semiconductor manufacturing equipment, if fine powder remains and deposits on a surface of an O-ring by plasma irradiation, there is a fear that fine powder released from the O-ring surface falls on a silicon wafer and deposits thereon during the semiconductor manufacturing process, and causes defects of a device. Therefore, it is desired that generation of particles is prevented or is as small as possible.

Namely, the present invention relates to a crosslinkable fluorine-containing elastomer composition comprising a crosslinkable fluorine-containing elastomer and silicon carbide particles having a bulk density of not more than 0.15 $g/cm^3$.

Silicon carbide particles to be used are preferably ones having an average particle size of not more than 50 nm, further preferably ones having a maximum particle size of not more than 100 nm substantially.

It is preferable that the silicon carbide particles are contained in an amount of 1 to 50 parts by mass based on 100 parts by mass of the crosslinkable fluorine-containing elastomer, from the viewpoint of satisfactory plasma resistance and mechanical strength of the crosslinkable fluorine-containing elastomer composition.

In addition, perfluoroelastomer is preferred as a crosslinkable fluorine-containing elastomer, and especially perfluoroelastomer comprising tetrafluoroethylene (TFE) unit as essential structural unit, particularly perfluoroelastomer comprising TFE and perfluoro(alkyl vinyl ether) unit exhibits satisfactory chemical resistance, solvent resistance and heat resistance and is preferred as a composition for a sealing material to be used under harsh environment.

The present invention also relates to a crosslinkable fluorine-containing elastomer composition comprising the crosslinkable fluorine-containing elastomer composition of the present invention and a crosslinking agent.

Further, the present invention relates to a molded article obtained by crosslinking the crosslinkable fluorine-containing elastomer composition of the present invention.

DETAILED DESCRIPTION OF THE INVENTION

Fluorine-containing elastomer which can be suitably used in the present invention is not limited particularly as far as it is one which has been used for a sealing material, especially for a sealing material for semiconductor manufacturing equipment. For example, crosslinkable elastomers described in WO 03/051999 together with preferable examples thereof and reasons for using them can be adopted also in the present invention.

Examples of fluorine-containing elastomer are, for instance, fluorine-containing rubbers (a), thermoplastic fluorine-containing rubbers (fluorine-containing multi-segment polymers) (b), and rubber compositions comprising these fluorine-containing rubbers.

Examples of the fluorine-containing rubbers (a) are non-perfluoro fluorine-containing rubbers (a-1) and perfluoro fluorine-containing rubbers (a-2).

Examples of the non-perfluoro fluorine-containing rubbers (a-1) are vinylidene fluoride (VdF) type fluorine-containing rubbers, tetrafluoroethylene (TFE)/propylene type fluorine-containing rubbers, tetrafluoroethylene (TFE)/propylene/vinylidene fluoride (VdF) type fluorine-containing rubbers, ethylene/hexafluoropropylene (HFP) type fluorine-containing rubbers, ethylene/hexafluoropropylene (HFP)/vinylidene fluoride (VdF) type fluorine-containing rubbers, ethylene/hexafluoropropylene (HFP)/tetrafluoroethylene (TFE) type fluorine-containing rubbers, fluorosilicone type fluorine-containing rubbers, fluorophosphazene type fluorine-containing rubbers, and the like. Those rubbers can be used alone or can be used in an optional combination thereof to such an extent not to impair the effect of the present invention.

Examples of the vinylidene fluoride type fluorine-containing rubbers are fluorine-containing elastic copolymers comprising 45 to 85% by mole of vinylidene fluoride and 55 to 15% by mole of at least one other monomer copolymerizable with vinylidene fluoride, preferably fluorine-containing elastic copolymers comprising 50 to 80% by mole of vinylidene fluoride and 50 to 20% by mole of at least one other monomer copolymerizable with vinylidene fluoride.

Examples of at least one other monomer copolymerizable with vinylidene fluoride are fluorine-containing monomers, for example, tetrafluoroethylene (TFE), chlorotrifluoroethylene (CTFE), trifluoroethylene, hexafluoropropylene (HFP), tri fluoropropylene, tetrafluoropropylene, pentafluoropropylene, trifluorobutene, tetrafluoroisobutene, perfluoro(alkyl vinyl ether) (PAVE) and vinyl fluoride, and non-fluorine-containing monomers such as ethylene, propylene and alkyl vinyl ether. These monomers can be used alone or can be used in an optional combination thereof. Among these monomers, it is preferable to use tetrafluoroethylene, hexafluoropropylene and perfluoro(alkyl vinyl ether).

Examples of perfluoro(alkyl vinyl ether) are, for instance, perfluoro(methyl vinyl ether), perfluoro(propyl vinyl ether), and the like, which can be used alone or can be used in an optional combination thereof to such an extent not to impair the effect of the present invention.

Examples of such a rubber are a VdF/HFP type rubber, a VdF/HFP/TFE type rubber, a VdF/CTFE type rubber, a VdF/CTFE/TFE type rubber, and the like.

The vinylidene fluoride type fluorine-containing rubbers can be prepared by a usual method.

Examples of the tetrafluoroethylene/propylene type fluorine-containing rubbers are fluorine-containing elastic copolymers comprising 45 to 70% by mole of tetrafluoroethylene, 55 to 30% by mole of propylene and 0 to 5% by mole of a monomer providing cure site.

Examples of a monomer providing cure site are iodine-containing monomers disclosed in JP5-63482B and JP7-316234A such as perfluoro(6,6-dihydro-6-iodo-3-oxa-1-hexene) and perfluoro(5-iodo-3-oxa-1-pentene), bromine-containing monomers disclosed in JP4-505341A, nitrile group-containing monomers, carboxyl group-containing monomers and alkoxycarbonyl group-containing monomers disclosed in JP4-505345A and JP5-500070A, and the like.

The tetrafluoroethylene/propylene type fluorine-containing rubbers can also be prepared by a usual method.

Examples of commercially available nonperfluoro fluorine-containing rubbers (a-1) are DIEL G-800 series and G-900 series available from Daikin Industries, Ltd.

Examples of the perfluoro fluorine-containing rubbers (a-2) are perfluoro rubbers comprising TFE, for example, fluorine-containing elastic copolymers comprising TFE, perfluoro(alkyl vinyl ether) (PAVE) and a monomer providing cure site. The proportions thereof are preferably 45 to 90/10 to 50/0 to 5 (mole %), more preferably 45 to 80/20 to 50/0 to 5, further preferably 53 to 70/30 to 45/0 to 2. If the proportions thereof are beyond the above-mentioned ranges, there is a tendency that elastic properties of rubber are lost and the rubber comes to have properties close to those of a resin.

In this case, examples of PAVE are perfluoro(methyl vinyl ether) (PMVE), perfluoro(propyl vinyl ether) (PPVE), and the like, which can be used alone or can be used in an optional combination thereof to such an extent not to impair the effect of the present invention.

Examples of a monomer providing cure site are iodine-containing monomers represented by the general formula (1):

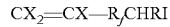

$$CX_2=CX-R_fCHRI$$

wherein X is H, F or $CH_3$; Rf is a fluoroalkylene group, a perfluoroalkylene group, a fluoropolyoxyalkylene group or a perfluoropolyoxyalkylene group; R is H or $CH_3$, and monomers represented by the general formula (2):

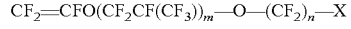

$$CF_2=CFO(CF_2CF(CF_3))_m-O-(CF_2)_n-X$$

wherein "m" is 0 or an integer of 1 to 5; "n" is an integer of 1 to 3; X is nitrile group, carboxyl group, alkoxycarbonyl group or a bromine atom. These monomers can be used alone or can be used in an optional combination thereof to such an extent not to impair the effect of the present invention. These iodine atom, nitrile group, carboxyl group, alkoxycarbonyl group and bromine atom function as cure sites.

The perfluoro fluorine-containing rubbers (a-2) can also be prepared by a usual method.

Examples of such perfluoro fluorine-containing rubbers (a-2) are fluorine-containing rubbers described in WO 97/24381, JP61-57324B, JP4-81608B and JP5-13961B.

The thermoplastic fluorine-containing rubber (b) is a rubber described in WO 03/051999 and comprising an elastomeric fluorine-containing polymer chain segment and a non-elastomeric fluorine-containing polymer chain segment, and examples thereof are a fluorine-containing multi-segmented polymer (b-1) in which at least 90% by mole of respective structural units of the elastomeric fluorine-containing polymer chain segment and the non-elastomeric fluorine-containing polymer chain segment is perhaloolefin, a fluorine-containing multi-segmented polymer (b-2) in which at least 90% by mole of structural units of the elastomeric fluorine-containing polymer chain segment is perhaloolefin and the non-elastomeric fluorine-containing polymer chain segment contains less than 90% by mole of perhaloolefin as a structural unit, and a fluorine-containing multi-segmented polymer (b-3) in which the elastomeric fluorine-containing polymer chain segment contains less than 90% by mole of perhaloolefin as a structural unit, and at least 90% by mole of structural units of the non-elastomeric fluorine-containing polymer chain segment is perhaloolefin, or the non-elastomeric fluorine-containing polymer chain segment contains less than 90% by mole of perhaloolefin as a structural unit.

With respect to preparation process of these thermoplastic fluorine-containing rubbers (b-1) to (b-3) or means for obtaining them, those described in WO 03/051999 can be used also in the present invention.

These crosslinkable fluorine-containing elastomers may contain cure site. Examples of cure site are iodine atom being present at the end of the trunk chain or side chain thereof (prepared by an iodine transfer polymerization method or the like), carboxyl group obtained by modifying a polymerization initiator such as ammonium persulfate, and cure site obtained by copolymerizing such a monomer providing cure site as mentioned above.

Examples of such a monomer are iodine-containing monomers disclosed in JP5-63482B and JP7-316234A such as perfluoro(6,6-dihydro-6-iodo-3-oxa-1-hexene) and perfluoro(5-iodo-3-oxa-1-pentene), bromine-containing monomers disclosed in JP4-505341A, nitrile group-containing monomers, carboxyl group-containing monomers and alkoxycarbonyl group-containing monomers disclosed in JP4-505345A and JP5-500070A, and the like.

Examples of other rubbers are fluorosilicone rubbers.

Filler to be blended to the fluorine-containing elastomer composition of the present invention are silicon carbide (SiC) particles having a bulk density of not more than 0.15 g/cm$^3$. Silicon carbide is raised as a preferable example of non-oxide filler in WO 03/051999, but a bulk density thereof is not described in it. Also, its particle size and an amount of generated particles are not described therein. Further, there are exemplified other non-oxide fillers in WO 03/051999 which are said to exhibit good effect in Examples thereof, such as aluminum nitride filler and silicon nitride filler, and further there are described carbon black and polyimide filler. However, in the case of fillers giving a small amount of weight reduction in $O_2$ plasma treatment and $O_2/CF_4$ plasma treatment, a large amount of particles is generated, and in the case of fillers generating a small amount of particles, there is a large amount of weight reduction. A specific silicon carbide filler to be blended to the elastomer composition of the present invention assures a small amount of weight reduction and is capable of inhibiting generation of particles.

The bulk density of the silicon carbide particles to be used in the present invention is not more than 0.15 g/cm$^3$. Silicon carbide particles having a bulk density exceeding 0.15 g/cm3 are not preferable because a large amount of particles is generated at irradiation of plasma even if an average particle size is the same. The bulk density is preferably not more than 0.10 g/cm$^3$, further preferably not more than 0.08 g/cm$^3$. A lower limit of bulk density of the existing silicon carbide particles is usually about 0.02 g/cm$^3$.

Also, an average particle size of silicon carbide particles is preferably not more than 50 nm. If the average particle size is larger than 50 nm, an amount of generated particles at plasma irradiation tends to become large. A preferred upper limit is 40 nm from the viewpoint that an amount of generated particles at plasma irradiation is small and satisfactory, and is further preferably 30 nm from the viewpoint that the bulk density is small and an amount of generated particles at plasma irradiation is smaller. A lower limit of an average particle size of the existing silicon carbide particles is usually about 10 nm. Further, silicon carbide particles substantially having a maximum particle size of not more than 100 nm, further not more than 50 nm are preferred.

With respect to a particle size distribution, it is preferable that the proportion of particles having a particle size exceeding 50 nm is not more than 40%, and the proportion of particles having a particle size exceeding 100 nm is not more than 2%. Further, it is preferable that the proportion of particles having a particle size exceeding 50 nm is not more than 20%, and the proportion of particles having a particle size exceeding 100 nm is not more than 1%, and it is especially preferable that the proportion of particles having a particle size exceeding 50 nm is not more than 10%, and the proportion of particles having a particle size exceeding 100 nm is not more than 0.5%.

It is preferable that these silicon carbide fine particles (nano particles) are formed, for example, by a pulverization method using a pulverizer such as jet mill or by a method of forming powders by core generation from an atom or a molecule and its growth. In the latter case, the method is classified into a vapor phase method, a liquid phase method and a solid phase method depending on a state of a starting material, and for example, nano particles of silicon carbide formed by plasma chemical vapor growth method are known.

The amount of silicon carbide particles to be blended is preferably not less than 1 part by mass based on 100 parts by mass of the crosslinkable fluorine-containing elastomer. If the amount is too small, functions of the filler can be hardly exhibited. A preferred lower limit of the amount is 5 parts by mass from the viewpoint of a small amount of weight reduction by plasma irradiation. An upper limit is 50 parts by mass, and if the amount is larger than that, there is a case where hardness of a molded article becomes very high and characteristics of elastomer are lost. A preferred upper limit is 30 parts by mass from the viewpoint that when forming into a molded article such as a sealing material, its hardness becomes satisfactory, and a further preferred upper limit is 20 parts by mass from the viewpoint that compression set which is an index of heat resistance is satisfactory.

In the case of using the crosslinkable fluorine-containing elastomer composition of the present invention for semiconductor manufacturing equipment applications where non-contaminating property is strongly required, crosslinking with high energy rays without adding a crosslinking agent is preferred. Examples of crosslinking sources to be used are X-ray, α-ray, β-ray, γ-ray, electron beam, proton beam, deuteron beam and ultraviolet ray. In this case, an amount of irradiation may be from 0.1 to 50 Mrad. In addition, irradiation temperature may be from −20° C. to 100° C. Irradiation may be carried out in an atmosphere such as air, nitrogen, argon and helium or in vacuo, and from the viewpoint of prevention of degradation by oxidation of a surface of a molded article, irradiation is carried out preferably in the presence of inert gas such as nitrogen, argon or helium, especially preferably in vacuo.

The present invention also relates to the crosslinkable fluorine-containing elastomer composition prepared by blending a crosslinking agent or a crosslinking aid to the crosslinkable fluorine-containing elastomer composition of the present invention.

Examples of the crosslinking system to be used in the present invention are, for example, a peroxide crosslinking, a polyol crosslinking, a polyamine crosslinking, a triazine crosslinking, an oxazole crosslinking, an imidazole crosslinking, or a thiazole crosslinking, and crosslinking agents and crosslinking aids to be used for these crosslinking systems can be used.

A crosslinking agent to be used in peroxide crosslinking may be organic peroxide which can easily generate peroxy radicals in the presence of heat or an oxidation-reduction system, and there are, for instance, 1,1-bis(t-butylperoxy)-3,5,5-trimethylcyclohexane, 2,5-dimethylhexane-2,5-dihydro peroxide, di-t-butyl peroxide, t-butylcumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexine-3, benzoyl peroxide, t-butyl peroxybenzene, 2,5-dimethyl-2,5-di(benzoylperoxy) hexane, t-butyl peroxymaleate, t-butylperoxy isopropylcarbonate, and the like. Among them, dialkyl peroxides are preferred. Further, 2,5-dimethyl-2,5-di(t-butylperoxy) hexane is especially preferred. Kind and an adding amount of the organic peroxide are generally selected in consideration of an amount of an active —O—O— and a decomposition temperature.

In addition, a crosslinking accelerator may be used in peroxide crosslinking system. A crosslinking accelerator is a compound having activity in a reaction with peroxy radical and polymer radical, and there are, for example, polyfunctional compounds having functional group such as $CH_2$=CH—, $CH_2$=CHCH$_2$— or $CF_2$=CF—. For example, there are triallyl cyanurate, triallyl isocyanurate (TAIC), triacryl formal, triallyl trimellitate, N,N'-n-phenylenebismaleimide, dipropargyl terephthalate, diallyl phthalate, tetraallylterephthalamide, triallyl phosphate, bismaleimide, fluorinated triallylisocyanurate(1,3,5-tris(2,3,3-trifluoro-2-propenyl)-1,3,5-triazine2,4,6-trion), tris(diallylamine)-s-triazine, triallyl phosphite, N,N-diallylacrylamide and 1,6-divinyldodecafluorohexane.

Examples of a crosslinking agent to be used in polyol crosslinking are polyhydric alcohol compounds such as bisphenol A and bisphenol AF.

Examples of a crosslinking agent to be used in polyamine crosslinking are polyamine compounds such as hexamethylenediamine carbamate, N,N'-dicinnamylidene-1,6-hexanediamine and 4,4'-bis(aminocyclohexyl)methane carbamate.

Triazine crosslinking system is a crosslinking system where a crosslinked structure is formed by formation of a triazine ring with crosslinkable group between the crosslinkable fluorine-containing elastomers, and a crosslinking aid is used to help formation of the triazine ring. Examples of the crosslinking aid are organotin compounds such as tetraphenyltin and triphenyltin, urea, ammonium salt and silicon nitride.

Examples of a crosslinking agent to be used in oxazole crosslinking system, imidazole crosslinking system and thiazole crosslinking system are bisaminothiophenol crosslinking agent, bisaminophenol crosslinking agent and bisdiaminophenyl crosslinking agent represented by the general formula (10):

General Formula (10)

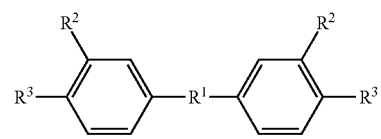

wherein $R^1$ is —$SO_2$—, —O—, —CO—, an alkylene group having 1 to 6 carbon atoms, a perfluoroalkylene group having 1 to 10 carbon atoms or a single bond; either $R^2$ or $R^3$ is —$NH_2$, and another one is —$NH_2$, —OH or —SH, preferably both of $R^2$ and $R^3$ are —$NH_2$, bisamidoxime crosslinking agent and bisamidrazone crosslinking agent represented by the general formula (11):

General Formula (11)

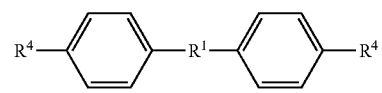

wherein $R^1$ is as defined above; $R^4$ is

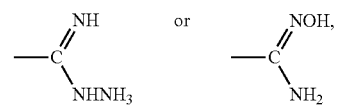

and bisamidoxime crosslinking agent and bisamidrazone crosslinking agent represented by the general formula (12) or the general formula (13):

General Formula (12)

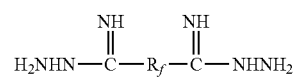

in which $R_f$ is a perfluoroalkylene group having 1 to 10 carbon atoms,

General Formula (13)

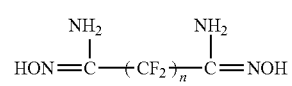

in which n is an integer of 1 to 10. While these bisaminophenol crosslinking agent, bisaminothiophenol crosslinking agent and bisdiaminophenyl crosslinking agent have been used for crosslinking system using nitrile group as cure site, they also react with carboxyl group and alkoxycarbonyl group to form an oxazole ring, a thiazole ring or an imidazole ring and provide a crosslinked article.

Among these crosslinking agents, from the viewpoint that heat resistance is especially excellent, crosslinking reaction is satisfactory and further, synthesis is relatively easy, more preferable crosslinking agents are bisdiaminophenyl crosslinking agents having at least two bisamino crosslinkable functional groups represented by the general formula (14):

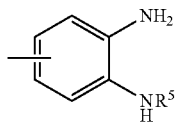

General Formula (14)

wherein $R^5$ is a fluorine atom or a monovalent organic group. Examples of functional group being reactable with these crosslinkable functional groups are nitrile group, carboxyl group and alkoxycarbonyl group, and an imidazole ring is formed by the reaction.

Further, examples of more preferable crosslinking agent are compounds represented by the general formula (15).

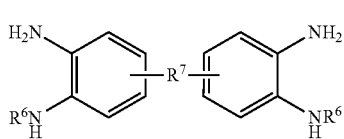

General Formula (15)

The substituent $R^6$ in the crosslinkable functional group is a monovalent organic group other than hydrogen atom or a fluorine atom, and a substituent forming N—$R^6$ bond having oxidation resistance being higher than that of N—H bond is especially preferable. The "substituent forming N—$R^6$ bond having oxidation resistance being higher than that of N—H bond" means a substituent forming N—$R^6$ bond being present in a compound to be hardly oxidized as compared with a compound having N—H bond when an imidazole ring is formed.

Nonlimiting examples of $R^6$ are aliphatic hydrocarbon groups which may have a substituent and a benzyl group and a phenyl group which may have a substituent.

For example, at least one of $R^6$ is a lower alkyl group having 1 to 10, especially 1 to 6 carbon atoms such as —$CH_3$, —$C_2H_5$ or —$C_3H_7$; a lower alkyl group having fluorine atom and 1 to 10, especially 1 to 6 carbon atoms such as $CF_3$, —$C_2F_5$, —$CH_2F$, —$CH_2CF_3$ or —$CH_2C_2F_5$; a phenyl group; a benzyl group; a phenyl group or a benzyl group, in which 1 to 5 hydrogen atoms are replaced by fluorine atoms, such as —$C_6F_5$ or —$CH_2C_6F_5$; or a phenyl group or a benzyl group, in which 1 to 5 hydrogen atoms are replaced by —$CF_3$, such as —$C_6H_{5-n}(CF_3)_n$ or —$CH_2C_6H_{5-n}(CF_3)_n$ (n is an integer of 1 to 5).

Among these, a phenyl group and —$CH_3$ are preferred from the viewpoint of especially excellent heat resistance, satisfactory crosslinking reactivity and further, relatively easy synthesis.

In the compound of the general formula (15), $R^7$ is —$SO_2$—, —O—, —CO—, an alkylene group which may have a substituent,

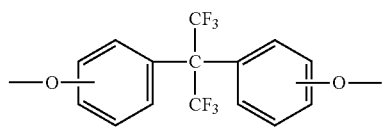

or a single bond.

Nonlimiting examples of preferred alkylene group $R^7$ which may have a substituent are, for instance, an unsubstituted alkylene group having 1 to 6 carbon atoms or a perfluoroalkylene group having 1 to 10 carbon atoms, and examples of a perfluoroalkylene group are

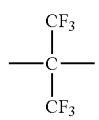

and the like. Also, known groups as exemplified in bisdiaminophenyl compounds described in JP2-59177B and JP8-120146A can be used as $R^7$.

$R^7$ may be bonded to any positions of the right and left benzene rings, and from the viewpoint that synthesis is easy and crosslinking reaction proceeds easily, it is preferable that $R^7$ is bonded so that either of $NH_2$ group or $NHR^7$ group is para-positioned.

Especially preferred crosslinking agent is a compound represented by the general formula (16):

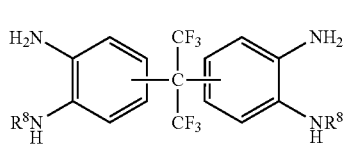

General Formula (16)

wherein R8 s are the same or different and each is an alkyl group having 1 to 10 carbon atoms; a fluorine atom-containing alkyl group having 1 to 10 carbon atoms; a phenyl group; a benzyl group; or a phenyl group or benzyl group, in which 1 to 5 hydrogen atoms are replaced by fluorine atoms or —$CF_3$.

Non-limiting examples thereof are 2,2-bis-[3-amino-4-(N-methylamino)phenyl]hexafluoropropane, 2,2-bis-[3-amino-4-(N-ethylamino)phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl] hexafluoropropane, 2,2-bis-[3-amino-4-(N-benzylamino) phenyl]hexafluoropropane, 2,2-bis-(3-amino-4-hydroxyphenyl)hexafluoropropane (common name: bis (aminophenol) AF), 2,2-bis-(3-amino-4mercaptophenyl) hexafluoropropane, tetraaminobenzene, bis-3,4-diaminophenylmethane, bis-3,4-diaminophenylether, 2,2-bis(3,4-diaminophenyl)hexafluoropropane and the like.

The crosslinking agents explained above are excellent in mechanical strength, heat resistance and chemical resistance, and provides a crosslinked article having especially well-balanced heat resistance and chemical resistance.

The amount of crosslinking agent for the crosslinkable fluorine-containing elastomer composition is preferably 0.05 to 10 parts by mass, more preferably 1 to 5 parts by mass based on 100 parts by mass of the crosslinkable fluorine-containing elastomer. When the amount of crosslinking agent is less than 0.05 part by mass, there is a tendency that the crosslinkable fluorine-containing elastomer is not sufficiently crosslinked, and when the amount exceeds 10 parts by mass, physical properties of a crosslinked article tend to be lowered.

Peroxide crosslinking can be carried out under usual crosslinking conditions for crosslinkable fluorine-containing elastomers. For example, a crosslinked article can be obtained by press-crosslinking in a metallic mold while holding at 120° to 200° C. for 1 to 60 minutes under pressure and subsequently crosslinking in an oven at 120° to 250° C. for 0 to 48 hours.

Oxazole crosslinking with a crosslinking agent such as bisaminophenol can be carried out under usual crosslinking conditions for crosslinkable elastomers. For example, a crosslinked article can be obtained by press-crosslinking in a metallic mold while holding at 120° to 250° C. for 1 to 60 minutes under pressure and subsequently crosslinking in an oven at 120° to 320° C. for 0 to 48 hours. Also, crosslinking can be carried out by known crosslinking method for crosslinkable elastomers, for example, polyamine crosslinking or polyol crosslinking or by combining peroxide crosslinking with addition of bis(aminophenol) AF or the like.

In addition, imidazole crosslinking, in which carboxyl group is crosslinked with a bisdiaminophenyl crosslinking agent, is most suitable for carboxyl-containing polymer having carboxyl group at a site other than its end, and provides a crosslinked article having satisfactory physical properties at relatively low crosslinking temperature (for example, 150° to 230° C., preferably 170° to 200° C.).

In the present invention, in the fields of applications where especially high purity and non-contaminating property are not required, usual additives to be blended to crosslinkable elastomer compositions such as filler, processing aid, plasticizer and coloring agent can be mixed as case demands, and at least one usual crosslinking agent or crosslinking aid other than those mentioned above may be mixed.

The composition of the present invention can be prepared by mixing each of the above-mentioned components by using usual processing equipment for elastomers, for example, an open roll, Banbury mixer, kneader, or the like. In addition, the composition can be prepared also by a method of using an internal mixer and a method of co-coagulation through emulsion mixing.

For producing a pre-molded article from the above-mentioned composition, usual known methods may be employed, such as a method of heating and compressing in a metallic mold, a method of putting in a heated metallic mold under pressure or a method of extruding with an extruder. In the cases of extruded products such as a hose and cable, since shapes thereof can be maintained even after the extruding, a pre-molded article extruded without using a crosslinking agent can be used as it is. Of course, it is possible to use a pre-molded article subjected to crosslinking by heating with steam by using a crosslinking agent. Also in the case of a shaped product such as O-ring, when it is difficult to hold a shape of the product in an un-crosslinked state after mold-releasing, it is possible to maintain the shape by using a pre-molded article crosslinked previously by using a crosslinking agent.

The above-mentioned crosslinkable composition can be suitably used for a molded article for semiconductor manufacturing equipment, particularly for a sealing material for sealing of semiconductor manufacturing equipment demanding a high degree of cleanliness, especially semiconductor manufacturing equipment in which high density plasma irradiation is carried out. Examples of the sealing material are O-ring, square ring, gasket, packing, oil seal, bearing seal, lip type seal, and the like.

In addition, the crosslinkable composition can be used for a variety of elastomer products, for example, diaphragm, tube, hose, various rubber rolls, and the like to be used on semiconductor manufacturing equipment. Also the composition can be used as a coating material, a laminating material and a lining material.

In the present invention, the semiconductor manufacturing equipment is not limited particularly to equipment for manufacturing semiconductors and encompasses whole manufacturing equipment used widely in the field of semiconductors where a high degree of cleanliness is required, such as equipment for manufacturing a liquid crystal panel and plasma panel.

Further, a coated molded article can also be prepared by coating an elastomeric molded article with the above-mentioned coating material and then carrying out crosslinking.

While articles made of various elastomeric materials can be used as an elastomeric molded article to be coated, fluorine-containing elastomers and silicone elastomers are preferred from the viewpoint of heat resistance.

Examples of the semiconductor manufacturing equipment are as follows.

(1) Etching system
Dry etching equipment
Plasma etching machine
Reactive ion etching machine
Reactive ion beam etching machine
Sputter etching machine
Ion beam etching machine
Wet etching equipment
Ashing equipment
(2) Cleaning system
Dry etching cleaning equipment
UV/O$_3$ cleaning machine
Ion beam cleaning machine
Laser beam cleaning machine
Plasma cleaning machine
Gas etching cleaning machine
Extractive cleaning equipment
Soxhlet extractive cleaning machine
High temperature high pressure extractive cleaning machine
Microwave extractive cleaning machine
Supercritical extractive cleaning machine
(3) Exposing system
Stepper
Coater and developer
(4) Polishing system
CMP equipment
(5) Film forming system
CVD equipment
Sputtering equipment
(6) Diffusion and ion implantation system
Oxidation and diffusion equipment
Ion implantation equipment Among these, excellent performance is exhibited when using as sealing materials for CVD equipment, plasma etching machine, reactive ion etching machine, ashing equipment and excimer laser exposing equipment, in which plasma treatment is carried out.

EXAMPLES

The present invention is then explained by means of examples, but is not limited to them.

In the present invention, each of physical properties is measured by the following methods.

(1) Bulk Density (Tap Density) (g/cm$^3$)

Into a 100 ml measuring cylinder (inner diameter: 28 mm) is poured 5 g of powder, and after tapping from a height of 2 cm 20 times, a scale is read and a density is calculated from a volume.

(2) Average Particle Size (Particle Size Distribution) (nm)

An average particle size (maximum particle size, particle size distribution) is calculated by making observation using scanning electron microscope FE-SEM (model JSM-6700F available from JEOL), selecting 200 primary particles at random from SEM image and measuring the size of them.

In the present invention, various plasma treatments and measurements were carried out by the following methods.

(Plasma Treatment)

Machine used for irradiation of plasma:

ICP high density plasma irradiation machine (Model RIE-101iPH available from SAMCO)

Conditions for irradiation:

O$_2$: flow rate: 16 sccm

O$_2$/CF$_4$: flow rate: 16/16 sccm

Power: 800 W

Pressure: 2.66 Pa

Irradiation temperature: 70° to 200° C.

Irradiation time: 30 minutes

Weight Reduction Ratio

O-rings of P24 size are used as samples, and three samples are used for each kind. A weight is measured up to two decimal places by using an electronic analyzing balance 2006MPE available from Sartorius GMBH and rounded to one decimal place. A ratio (mass %) of the weight after plasma irradiation to the weight before plasma irradiation is calculated, and an average thereof is taken.

Evaluation of Particles (Amount of Particles on Surface (Mass %))

O-rings of P24 size are used as samples, and three samples are used for each kind. A weight is measured after plasma irradiation, and then after subjecting the irradiated O-ring to ultrasonic cleaning in pure water to remove particles existing on its surface, the O-ring is dried at 150° C. for one hour in an oven and its weight is measured again. A difference in weight before and after the cleaning is a weight of particles on the surface. A ratio of the weight of particles on the surface to the weight of O-ring before the cleaning is calculated.

Transfer of Particles onto a Tape

A transparent adhesive tape is stuck on a surface of O-ring irradiated with plasma, and transfer of particles on the tape is checked with naked eyes.

Shore A Hardness

Measuring is carried out according to ASTM D2240 using an analog hardness meter Model A available from Kobunshi Keiki Kabushiki Kaisha.

Compression Set

Compression set of O-ring (P24 size) is measured according to JIS K6301 after compression at 300° C. for 70 hours.

Example 1

A crosslinkable fluorine-containing elastomer (a perfluoroelastomer comprising TFE/PMVE (=55 to 70/30 to 45 (mole %)) having, as crosslinkable group, a group derived from CF$_2$=CFOCF$_2$CF(CF$_3$)OCF$_2$CF$_2$CN (CNVE)) was used as a crosslinkable elastomer, and to 100 parts by mass of this fluorine-containing elastomer were mixed 0.9 part by mass of 2,2-bis[3-amino-4-(N-phenylamino)phenyl]hexafluoropropane (NphAF) (available from Chugai Kasei Co., Ltd.) and 10 parts by mass of silicon carbide particles (FC0708 available from Institute of Energy Science and Technology Co., Ltd., average particle size: 30 nm, proportion of particles having a particle size of not more than 50 nm: 100%, bulk density: 0.07 g/cm$^3$), followed by kneading with an open roll to obtain a crosslinkable elastomer composition.

The obtained crosslinkable elastomer composition was subjected to press-crosslinking at 180° C. over 20 minutes and then oven-crosslinking in an air oven of 290° C. over 18 hours to obtain a molded article (O-ring) of P24 size.

Hardness and compression set of this molded article were measured, and the molded article was subjected to irradiation treatment with O$_2$ plasma and O$_2$/CF$_4$ plasma to examine a weight change (weight reduction ratio), an amount of particles on the surface of the molded article and transfer of particles after the irradiation. The results are shown in Table 1.

Example 2

A crosslinkable elastomer composition was prepared in the same manner as in Example 1 except that the amount of silicon carbide particles was changed to 15 parts by mass, and the composition was subjected to crosslinking and molding to obtain a molded article (O-ring) of P24 size.

Hardness and compression set of this molded article were measured, and the molded article was subjected to irradiation treatment with O$_2$ plasma and O$_2$/CF$_4$ plasma to examine a weight change (weight reduction ratio), an amount of particles on the surface of the molded article and transfer of particles after the irradiation. The results are shown in Table 1.

Example 3

A crosslinkable elastomer composition was prepared in the same manner as in Example 1 except that silicon carbide particles (available from Nanosino Industrial Co., Ltd. 0) having an average particle size of 40 nm and a bulk density of 0.10 g/cm$^3$ were used as silicon carbide particles, and the composition was subjected to crosslinking and molding to obtain a molded article (O-ring) of P24 size.

Hardness and compression set of this molded article were measured, and the molded article was subjected to irradiation treatment with O$_2$ plasma and O$_2$/CF$_4$ plasma to examine a weight change (weight reduction ratio), an amount of particles on the surface of the molded article and transfer of particles after the irradiation. The results are shown in Table 1.

Example 4

A crosslinkable elastomer composition was prepared in the same manner as in Example 1 except that the silicon carbide particles used in Example 3 were used in an amount of 15 parts by mass, and the composition was subjected to crosslinking and molding to obtain a molded article (O-ring) of P24 size.

Hardness and compression set of this molded article were measured, and the molded article was subjected to irradiation treatment with O$_2$ plasma and O$_2$/CF$_4$ plasma to examine a weight change (weight reduction ratio), an amount of particles on the surface of the molded article and transfer of particles after the irradiation. The results are shown in Table 1.

Example 5

A crosslinkable fluorine-containing elastomer (iodine content: 0.3% by mass) comprising tetrafluoroethylene (TFE) and perfluoro(methyl vinyl ether) (PMVE) (TFE/PMVE=67/33 (mole %)) as a crosslinkable elastomer, a peroxide crosslinking agent (PERHEXA 2.5B available from NOF Corporation), a crosslinking accelerator (triallyl isocyanurate (TAIC) (available from Nippon Kasei Chemical Co., Ltd.)) and silicon carbide particles used in Example 1 were mixed in a mass ratio of 100/1/2/15, followed by kneading with an open roll to obtain a crosslinkable elastomer composition.

The obtained crosslinkable elastomer composition was subjected to crosslinking at 155° C. over 10 minutes and then oven-crosslinking in an air oven of 180° C. over four hours to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Example 6

A crosslinkable fluorine-containing elastomer (Mooney viscosity $ML_{1+10}$ (121° C.): 19, iodine content: 0.3% by mass) comprising vinylidene fluoride (VdF), hexafluoropropylene (HFP) and tetrafluoroethylene (TFE) (VdF/HFP/TFE=50/30/20 (mole %)) as a crosslinkable elastomer, a peroxide crosslinking agent (PERHEXA 2.5B available from NOF Corporation), a crosslinking accelerator (triallyl isocyanurate (TAIC) (available from Nippon Kasei Chemical Co., Ltd.)) and silicon carbide particles used in Example 1 were mixed in a mass ratio of 100/1.5/4/15, followed by kneading with an open roll to obtain a crosslinkable elastomer composition.

The obtained crosslinkable elastomer composition was subjected to crosslinking at 160° C. over 10 minutes and then oven-crosslinking in an air oven of 180° C. over four hours to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Example 7

A crosslinkable fluorine-containing elastomer of thermoplastic fluorine-containing elastomer (comprising VdF, HFP, TFE and ethylene as structural units) as a crosslinkable elastomer and silicon carbide particles used in Example 1 were mixed in a mass ratio of 100/15, followed by kneading with a kneader to obtain a crosslinkable elastomer composition.

The obtained crosslinkable elastomer composition was subjected to compression molding at 240° C. and then crosslinking with radiation to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Example 8

A crosslinkable elastomer composition was prepared in the same manner as in Example 1 except that silicon carbide particles (available from Energy Science and Technology Co., Ltd.) having an average particle size of 40 nm and a bulk density of 0.12 g/cm$^3$ were used as silicon carbide particles, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Example 9

A crosslinkable elastomer composition was prepared in the same manner as in Example 1 except that 0.4 part by mass of silicon nitride fine particles (average particle size: 30 nm, pulverized SA-00 available from Ube Industries, Ltd.) were used as a crosslinking agent.

The obtained crosslinkable elastomer composition was subjected to press-crosslinking at 180° C. over 20 minutes and then oven-crosslinking in an air oven of 250° C. over 18 hours to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Example 10

A crosslinkable fluorine-containing elastomer (Mooney viscosity $ML_{1+10}$ (121° C.): 23, iodine content: 0.3% by mass) comprising vinylidene fluoride (VdF) and hexafluoropropylene (HFP) (VdF/HFP=78/22 (mole %)) as a crosslinkable elastomer, a peroxide crosslinking agent (PERHEXA 2.5B available from NOF Corporation), a crosslinking accelerator (triallyl isocyanurate (TAIC) (available from Nippon Kasei Chemical Co., Ltd.)) and silicon carbide particles used in Example 1 were mixed in a mass ratio of 100/1.5/4/15, followed by kneading with an open roll to obtain a crosslinkable elastomer composition.

The obtained crosslinkable elastomer composition was subjected to crosslinking at 160° C. over 10 minutes and then oven-crosslinking in an air oven of 180° C. over four hours to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 1.

Comparative Example 1

A crosslinkable elastomer composition was prepared in the same manner as in Example 1 except that silicon carbide particles (CH0706 available from Institute of Energy Science and Technology Co., Ltd.) having an average particle size of 45 nm and a bulk density of 0.17 g/cm$^3$ and comprising 50% of particles having a particle size exceeding 50 nm and 2% of particles having a particle size exceeding 100 nm in a particle size distribution were used as silicon carbide particles, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 2

A crosslinkable elastomer composition was prepared in the same manner as in Comparative Example 1 except that the amount of silicon carbide particles was changed to 15 parts by mass, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 3

A crosslinkable elastomer composition was prepared in the same manner as in Example 1 except that silicon carbide particles having an average particle size of 40 nm and a bulk density of 0.26 g/cm$^3$ (available from Nanosino Industrial Co., Ltd.) were used as silicon carbide particles, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 4

A crosslinkable elastomer composition was prepared in the same manner as in Comparative Example 3 except that the amount of silicon carbide particles used in Comparative Example 3 was changed to 15 parts by mass, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Examples 5

A crosslinkable elastomer composition was prepared in the same manner as in Example 1 except that silicon carbide particles having an average particle size of 130 nm and a bulk density of 0.49 g/cm$^3$ (available from Nanostructured & Amorphous Materials, Inc.) were used as silicon carbide particles, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 6

A crosslinkable elastomer composition was prepared in the same manner as in Comparative Example 5 except that the amount of silicon carbide particles used in Comparative Example 5 was changed to 15 parts by mass, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 7

A crosslinkable elastomer composition was prepared in the same manner as in Example 5 except that the silicon carbide particles used in Comparative Example 1 were used as silicon carbide particles in an amount of 10 parts by mass, and the composition was subjected to crosslinking and molding to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 8

A crosslinkable elastomer composition was prepared in the same manner as in Example 1 except that aluminum oxide particles (AKP-800 available from Sumitomo Chemical Industry Co., Ltd., average particle size: 30 nm, bulk density: 0.38 g/cm$^3$) were used instead of silicon carbide particles in an amount of 10 parts by mass based on 100 parts by mass of the crosslinkable elastomer, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 9

A crosslinkable elastomer composition was prepared in the same manner as in Example 1 except that silicon oxide ($SiO_2$) particles (available from Aerosil Co., Ltd., average particle size: 30 nm, bulk density: 0.05 g/cm$^3$) were used instead of silicon carbide particles in an amount of 15 parts by mass based on 100 parts by mass of the crosslinkable elastomer, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 10

A crosslinkable elastomer composition was prepared in the same manner as in Example 1 except that carbon black particles (available from Cancarb Co., Ltd., average particle size: 300 nm, bulk density: 0.68 g/cm$^3$) were used instead of silicon carbide particles in an amount of 15 parts by mass based on 100 parts by mass of the crosslinkable elastomer, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 11

A crosslinkable elastomer composition was prepared in the same manner as in Example 1 except that polyimide particles (pulverized UIP-S available from Ube Industries, Ltd., average particle size: 3,000 nm, bulk density: 0.57 g/cm$^3$) were used instead of silicon carbide particles in an amount of 15 parts by mass based on 100 parts by mass of the crosslinkable elastomer, and the composition was subjected to crosslinking and molding to obtain a molded article (O-ring) of P24 size.

Hardness and compression set of this molded article were measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 12

A crosslinkable elastomer composition was prepared in the same manner as in Example 6 except that the silicon carbide particles used in Comparative Example 1 were used as silicon carbide particles, and the composition was subjected to crosslinking and molding to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

Comparative Example 13

A crosslinkable elastomer composition was prepared in the same manner as in Example 7 except that the silicon carbide particles used in Comparative Example 1 were used as silicon carbide particles, and the composition was subjected to crosslinking and molding to obtain a molded article (O-ring) of P24 size.

Hardness of this molded article was measured, and the molded article was subjected to irradiation treatment with $O_2$ plasma and $O_2/CF_4$ plasma to examine a weight change (weight reduction ratio), an amount of particles on the surface of the molded article and transfer of particles after the irradiation. The results are shown in Table 2.

TABLE 1

| | | | Example | | | | |
|---|---|---|---|---|---|---|---|
| | | | 1 | 2 | 3 | 4 | 5 |
| Crosslinkable elastomer (part by mass) | | | | | | | |
| TFE/PMVE/CNVE | | | 100 | 100 | 100 | 100 | — |
| TFE/PMVE | | | — | — | — | — | 100 |
| VdF/HFP/TFE | | | — | — | — | — | — |
| VdF/HFP | | | — | — | — | — | — |
| Thermoplastic elastomer | | | — | — | — | — | — |
| Filler (part by mass) | Bulk density (g/cm$^3$) | Average particle size | | | | | |
| Silicon carbide | 0.07 | 30 nm | 10 | 15 | — | — | 15 |
| Silicon carbide | 0.10 | 40 nm | — | — | 10 | 15 | — |
| Silicon carbide | 0.12 | 40 nm | — | — | — | — | — |
| Crosslinking agent (part by mass) | | | | | | | |
| NphAF | | | 0.9 | 0.9 | 0.9 | 0.9 | — |
| PERHEXA 2.5B | | | — | — | — | — | 1 |
| Silicon nitride | | | — | — | — | — | — |

TABLE 1-continued

| Crosslinking accelerator (part by mass) | | | | | |
|---|---|---|---|---|---|
| TAIC | — | — | — | — | 2 |
| Hardness (Shore A) | 70 | 75 | 70 | 75 | 75 |
| Compression set (70 hr/300° C.) | 37 | 51 | 37 | 50 | — |
| Resistance to plasma | | | | | |
| $O_2$ plasma irradiation | | | | | |
| Weight reduction ratio (%) | 6.1 | 4.5 | 6.2 | 4.5 | 4.3 |
| Amount of particles on surface (%) | 0.01 | 0.02 | 0.02 | 0.02 | 0.02 |
| Transfer of particles | Nil | Nil | Nil | Nil | Nil |
| $O_2/CF_4$ plasma irradiation | | | | | |
| Weight reduction ratio (%) | 5.7 | 4.3 | 5.8 | 4.4 | 4.1 |
| Amount of particles on surface (%) | 0.01 | 0.01 | 0.01 | 0.02 | 0.01 |
| Transfer of particles | Nil | Nil | Nil | Nil | Nil |

| | | | Example | | | |
|---|---|---|---|---|---|---|
| | | | 6 | 7 | 8 | 9 | 10 |

| Crosslinkable elastomer (part by mass) | | | | | | | |
|---|---|---|---|---|---|---|---|
| TFE/PMVE/CNVE | | | — | — | 100 | 100 | — |
| TFE/PMVE | | | — | — | — | — | — |
| VdF/HFP/TFE | | | 100 | — | — | — | — |
| VdF/HFP | | | — | — | — | — | 100 |
| Thermoplastic elastomer | | | — | 100 | — | — | — |
| Filler (part by mass) | Bulk density (g/cm³) | Average particle size | | | | | |
| Silicon carbide | 0.07 | 30 nm | 15 | 15 | — | 15 | 15 |
| Silicon carbide | 0.10 | 40 nm | — | — | — | — | — |
| Silicon carbide | 0.12 | 40 nm | — | — | 15 | — | — |
| Crosslinking agent (part by mass) | | | | | | | |
| NphAF | | | — | — | 0.9 | — | — |
| PERHEXA 2.5B | | | 1.5 | — | — | — | 1.5 |
| Silicon nitride | | | — | — | — | 0.4 | — |
| Crosslinking accelerator (part by mass) | | | | | | | |
| TAIC | | | 4 | — | — | — | 4 |
| Hardness (Shore A) | | | 75 | 79 | 74 | 74 | 81 |
| Compression set (70 hr/300° C.) | | | — | — | 45 | 43 | — |
| Resistance to plasma | | | | | | | |
| $O_2$ plasma irradiation | | | | | | | |
| Weight reduction ratio (%) | | | 5.5 | 5.7 | 4.6 | 4.4 | 5.3 |
| Amount of particles on surface (%) | | | 0.01 | 0.01 | 0.02 | 0.01 | 0.01 |
| Transfer of particles | | | Nil | Nil | Nil | Nil | Nil |
| $O_2/CF_4$ plasma irradiation | | | | | | | |
| Weight reduction ratio (%) | | | 5.2 | 5.7 | 4.5 | 4.2 | 5.4 |
| Amount of particles on surface (%) | | | 0.01 | 0.01 | 0.02 | 0.01 | 0.01 |
| Transfer of particles | | | Nil | Nil | Nil | Nil | Nil |

TABLE 2

| | | | Comparative Example | | | | | | |
|---|---|---|---|---|---|---|---|---|---|
| | | | 1 | 2 | 3 | 4 | 5 | 6 | 7 |
| Crosslinkable elastomer (part by mass) | | | | | | | | | |
| TFE/PMVE/CNVE | | | 100 | 100 | 100 | 100 | 100 | 100 | — |
| TFE/PMVE | | | — | — | — | — | — | — | 100 |
| VdF/HFP/TFE | | | — | — | — | — | — | — | — |
| Thermoplastic elastomer | | | — | — | — | — | — | — | — |
| Filler (part by mass) | Bulk density (g/cm³) | Average Particle size | | | | | | | |
| Silicon carbide | 0.17 | 45 nm | 10 | 15 | — | — | — | — | 10 |
| Silicon carbide | 0.26 | 40 nm | — | — | 10 | 15 | — | — | — |
| Silicon carbide | 0.49 | 130 nm | — | — | — | — | 10 | 15 | — |

TABLE 2-continued

|  | Bulk density (g/cm³) | Average particle size |  |  |  |  |  |  |
|---|---|---|---|---|---|---|---|---|
| Aluminum oxide | 0.38 | 30 nm | — | — | — | — | — | — |
| Silicon oxide | 0.05 | 30 nm | — | — | — | — | — | — |
| Carbon black | 0.68 | 300 nm | — | — | — | — | — | — |
| Polyimide particles | 0.57 | 3,000 nm | — | — | — | — | — | — |
| Crosslinking agent (part by mass) | | | | | | | | |
| NphAF | | | 0.9 | 0.9 | 0.9 | 0.9 | 0.9 | 0.9 | — |
| PERHEXA 2.5B | | | — | — | — | — | — | — | 1 |
| Crosslinking accelerator (part by mass) | | | | | | | | |
| TAIC | | | — | — | — | — | — | — | 2 |
| Hardness (Shore A) | | | 70 | 75 | 70 | 75 | 69 | 74 | 70 |
| Compression set (70 hr/300° C.) | | | 37 | 50 | 36 | 48 | 30 | 38 | — |
| Resistance to plasma | | | | | | | | | |
| O₂ plasma irradiation | | | | | | | | | |
| Weight reduction ratio (%) | | | 6.8 | 5.0 | 6.3 | 4.4 | 7.4 | 6.1 | 4.3 |
| Amount of particles on surface (%) | | | 0.06 | 0.07 | 0.05 | 0.07 | 0.06 | 0.08 | 0.07 |
| Transfer of particles | | | found | found | found | found | found | found | found |
| O₂/CF₄ plasma irradiation | | | | | | | | | |
| Weight reduction ratio (%) | | | 6.5 | 4.8 | 5.9 | 4.2 | 7.0 | 5.7 | 4.0 |
| Amount of particles on surface (%) | | | 0.06 | 0.07 | 0.06 | 0.07 | 0.06 | 0.08 | 0.07 |
| Transfer of particles | | | found | found | found | found | found | found | Found |

|  |  |  | Comparative Example | | | | | |
|---|---|---|---|---|---|---|---|---|
|  |  |  | 8 | 9 | 10 | 11 | 12 | 13 |
| Crosslinkable elastomer (part by mass) | | | | | | | | |
| TFE/PMVE/CNVE | | | 100 | 100 | 100 | 100 | — | — |
| TFE/PMVE | | | — | — | — | — | — | — |
| VdF/HFP/TFE | | | — | — | — | — | 100 | — |
| Thermoplastic elastomer | | | — | — | — | — | — | 100 |
| Filler (part by mass) | Bulk density (g/cm³) | Average particle size | | | | | | |
| Silicon carbide | 0.17 | 45 nm | — | — | — | — | 15 | 15 |
| Silicon carbide | 0.26 | 40 nm | — | — | — | — | — | — |
| Silicon carbide | 0.49 | 130 nm | — | — | — | — | — | — |
| Aluminum oxide | 0.38 | 30 nm | 10 | — | — | — | — | — |
| Silicon oxide | 0.05 | 30 nm | — | 15 | — | — | — | — |
| Carbon black | 0.68 | 300 nm | — | — | 15 | — | — | — |
| Polyimide particles | 0.57 | 3,000 nm | — | — | — | 15 | — | — |
| Crosslinking agent (part by mass) | | | | | | | | |
| NphAF | | | 0.9 | 0.9 | 0.9 | 0.9 | — | — |
| PERHEXA 2.5B | | | — | — | — | — | 1.5 | — |
| Crosslinking accelerator (part by mass) | | | | | | | | |
| TAIC | | | — | — | — | — | 4 | — |
| Hardness (Shore A) | | | 70 | 76 | 71 | 71 | 75 | 79 |
| Compression set (70 hr/300° C.) | | | 71 | 65 | 27 | 30 | — | — |
| Resistance to plasma | | | | | | | | |
| O₂ plasma irradiation | | | | | | | | |
| Weight reduction ratio (%) | | | 2.1 | 5.0 | 5.3 | 11.8 | 5.6 | 5.9 |
| Amount of particles on surface (%) | | | 0.21 | 0.03 | 0.06 | 0.01 | 0.08 | 0.07 |
| Transfer of particles | | | found | Nil | found | Nil | found | found |
| O₂/CF₄ plasma irradiation | | | | | | | | |
| Weight reduction ratio (%) | | | 2.1 | 6.4 | 1.7 | 11.0 | 5.4 | 6.0 |
| Amount of particles on surface (%) | | | 0.25 | 0.02 | 0.22 | 0.01 | 0.08 | 0.08 |
| Transfer of particles | | | found | Nil | found | Nil | found | found |

From Tables 1 and 2, it is seen that by blending silicon carbide particles having a bulk density of not more than 0.15 g/cm³, weight reduction due to irradiation with O₂ plasma and fluorine-containing (O₂/CF₄) plasma is small and generation of particles can be significantly inhibited The crosslinkable fluorine-containing elastomer composition of the present invention, further the crosslinkable fluorine-containing elastomer composition comprising a crosslinking agent can provide a molded article which assures a small change in weight in both of O₂ plasma treatment and O₂/CF₄ plasma treatment and is capable of significantly inhibiting generation of foreign matters (particles) in these treatments.

We claim:

1. A crosslinkable fluorine-containing elastomer composition comprising a crosslinkable fluorine-containing elastomer and silicon carbide particles, wherein the silicon carbide particles have a bulk density of not more than 0.15 g/cm$^3$, an average particle size of the silicon carbide particles is not more than 50 nm and a proportion of particles having a particle size exceeding 50 nm is not more than 40%, wherein a proportion of particles having a particle size exceeding 100 nm is not more than 2%, and wherein the silicon carbide particles in the fluorine-containing elastomer composition provides a smaller amount of surface contamination in comparison to a composition having the same fluorine-containing elastomer but comprising silicon carbide filler having a bulk density of 0.17 g/cm$^3$ to 0.49 g/cm$^3$ and an average particle size of 40 nm to 130 nm.

2. The composition of claim 1, wherein the silicon carbide particles are contained in an amount of 1 to 50 parts by mass based on 100 parts by mass of the crosslinkable fluorine-containing elastomer.

3. A crosslinkable fluorine-containing elastomer composition comprising the crosslinkable fluorine-containing elastomer composition of claim 2 and a crosslinking agent or a crosslinking aid.

4. The composition of claim 1, wherein the crosslinkable fluorine-containing elastomer is a copolymer comprising tetrafluoroethylene unit and perfluoro(alkyl vinyl ether) unit as structural units.

5. A crosslinkable fluorine-containing elastomer composition comprising the crosslinkable fluorine-containing elastomer composition of claim 4 and a crosslinking agent or a crosslinking aid.

6. A crosslinkable fluorine-containing elastomer composition comprising the crosslinkable fluorine-containing elastomer composition of claim 1 and a crosslinking agent or a crosslinking aid.

7. A molded article obtained by crosslinking the crosslinkable fluorine-containing elastomer composition of claim 6.

8. A molded article obtained by crosslinking the crosslinkable fluorine-containing elastomer composition of claim 1.

9. The crosslinkable fluorine-containing elastomer of claim 1, wherein an amount of particles on the surface of an article comprising the crosslinkable fluorine-containing elastomer composition after curing and O$_2$ or O$_2$/CF$_4$ plasma irradiation is about 0.01 mass % to about 0.02 mass %.

10. The crosslinkable fluorine-containing elastomer of claim 4, the amount of particles on the surface after O$_2$ or O$_2$/CF$_4$ plasma irradiation is determined using an ICP high density plasma irradiation machine to provide the O$_2$ or O$_2$/CF$_4$ plasma irradiation at an O$_2$ flow rate of 16 sccm or an O$_2$/CF$_4$ flow rate of 16/16 sccm, and set at a power of 800 W and an irradiation time of 30 minutes.

11. A crosslinkable fluorine-containing elastomer composition comprising the crosslinkable fluorine-containing elastomer composition of claim 10 and a crosslinking agent or a crosslinking aid.

12. A molded article obtained by crosslinking the crosslinkable fluorine-containing elastomer composition of claim 11.

13. A method of reducing the amount of surface contamination on a molded article after exposure to O$_2$ or O$_2$/CF$_4$ plasma, the method comprising incorporating into a fluorine-containing elastomer composition silicon carbide particles having a bulk density of not more than 0.15 g/cm$^3$ and an average particle size of not more than 50 nm, wherein a proportion of the particles having a particle size exceeding 50 nm is not more than 40%, wherein a portion of particles having a particle size exceeding 100 nm is not more than 2%, and in an amount of 1 to 50 parts by mass of the silicon carbide particles based on 100 parts by mass of the crosslinkable fluorine-containing elastomer in the fluorine-containing elastomer composition wherein the amount of surface contamination is smaller in comparison to a composition having the same fluorine-containing elastomer but comprising a silicon carbide filler having a bulk density of 0.17 g/cm$^3$ to 0.49 g/cm$^3$ and an average particle size of 40 nm to 130 nm.

* * * * *